Jan. 31, 1961 S. ZAHLHAAS ET AL 2,970,190

EXTENDING CONNECTION PATHS IN A FIELD OF COUPLING POINTS

Filed Jan. 7, 1959 3 Sheets-Sheet 1

Inventors
Siegfried Zahlhaas
and Ralf Kähler
By
att'y.

Inventors
Siegfried Zahlhaas
and Ralf Kähler
By [signature] atty.

Inventors
Siegfried Zahlhaas
and Ralf Kähler
By [signature] atty.

United States Patent Office 2,970,190

Patented Jan. 31, 1961

2,970,190

EXTENDING CONNECTION PATHS IN A FIELD OF COUPLING POINTS

Siegfried Zahlhaas and Ralf Kähler, Munich, Germany, assignors to Siemens & Halske Aktiengesellschaft, Berlin and Munich, Germany, a corporation of Germany Filed Jan. 7, 1959, Ser. No. 785,425

Claims priority, application Germany Jan. 15, 1958

14 Claims. (Cl. 179—22)

This invention is concerned with a switching system and arrangement for hunting, selecting and extending (routing) idle connection paths in a two-stage field of coupling points.

A field of coupling points, sometimes also referred to, for example, in U.S. Patent No. 2,843,674, is "cross point network" is used, for example, in extending connections in telephone systems. U.S. Patent No. 2.779,-824 may be mentioned as a pertinent disclosure, showing in Fig. 1 a field of coupling points subdivided into three stages, each stage containing coordinate switches, the switching contacts of these switches being arranged at the socalled coupling points. Fields of coupling points or cross point networks are also disclosed in copending applications Serial Nos. 760,238 and 762,656, filed respectively September 10, 1958, and September 20, 1958, both owned by the assignee named in the present application.

The object of the present invention is to solve in particularly advantageous manner the problem of routing, in a particular type of a two-stage field of coupling points, an idle connection path extending between a predetermined inlet and an idle one of a group of outlets, and if there are several idle outlets present, of selecting one of them. The invention also proposes circuit means for effecting the setting of the coupling point contacts at the involved coupling points so as to extend the corresponding connection path.

In the two stages of the field of coupling points involved, briefly referred to as coupling field, the coupling points are arranged in crossing manner. The coupling point contacts of the inlet coupling stage are row-wise and column-wise connected in multiple, forming a so-called coupling multiple. Multiple switches such as coordinate switches, crossbar switches, cross-coil switches or relay couplers may be employed for realizing the coupling multiple. At each coupling point is provided a coupling element which is operatively actuated upon extending a connection path thereover. Its coupling point contacts of which several can be provided, are thereby set. To the columns of the coupling multiple, which may be designated as inlet coupling multiple, are respectively connected a predetermined inlet of the coupling field, and to the lines or rows are connected trunk lines. The trunk lines lead to a second coupling multiple which constitutes the second stage of the coupling field and which may be designated as the outlet coupling multiple. The trunk lines coming from the inlet coupling multiple are respectively connected to columns of the outlet coupling multiple at which the coupling points are likewise column-wise multipled. However, in the lines or rows, they are not connected in multiple, but are allotted to individual outlets of the coupling field. Upon using for the inlet coupling multiple and for the outlet multiple, multiple switches of approximately the same capacity, there will result a coupling field having considerably more outlets than inlets.

Coupling fields constructed in this manner have already been used in connection with connector selection stages and group selector stages. In the case of use in connection with a connector selection stage, a predetermined inlet is to be connected with a predetermined outlet provided, of course, that the latter is idle. Since there is in the corresponding coupling field only one single connection path between a predetermined inlet and a predetermined outlet, the setting of such path is relatively simple. In the case of using the coupling field in connection with a group selection stage, a predetermined inlet is to be connected with an idle outlet in a group of outlets, such group always including the outlets of a predetermined line or row of the outlet coupling multiple. These outlets constitute an outlet group. Accordingly, it is prior to the routing of a call at least known between which inlet of the inlet coupling multiple and which line or row of the outlet coupling multiple the connection path is to extend.

However, in the system according to the invention, the desired outlet group may involve several lines or rows of the outlet coupling multiple. Establishing a connection is in these circumstances considerably more difficult than in the case of the known group selection stage, there being greater uncertainty with respect to the connection path since the line or row of the outlet coupling multiple, which is to be used, is unknown prior to the establishment of the connection.

Such a selection stage offers on the other hand the advantage that it is also usable as a directional stage in systems involving problems to be now briefly mentioned. In the building up of connections extending from one local exchange to the local exchange of a called subscriber, above all when the corresponding exchanges are far apart, there are several possible paths extending over different lines and intermediate exchanges. For example, if the connection possibilities by way of the shortest path are busy, other connection possibilities over by-pass lines may still be available, one of which will necessarily have to be used. The routing of a call may accordingly be effected over trunk bundles going out in different directions. The number of trunks available in each direction may be considerably greater than the number of outlets that may be connectible to a line or row of the outlet coupling multiple. It will then be necessary to provide for each direction several lines or rows, the outlets of which form the previously mentioned outlet groups. Upon determining the direction in which a connection is to be extended, a connection path will have to be set from the predetermined inlet involved in the call, to one of the outlets lying in the outlet group belonging to the corresponding direction.

Since the coupling field has a plurality of inlets, a plurality of calls may simultaneously occur. In order to avoid confusion in the (routing) of calls, simultaneous calls are usually handled successively. This entails waiting times which are in otherwise similar conditions the longer, the longer the duration of hunting, selection and setting of a connection path. The series connection of several selection stages may prolong the waiting time. However, in telephone systems, the waiting time must not exceed in part the duration of the time required for intermediate selection operations. It is accordingly necessary to effect quick hunting, selection and setting (routing) of the connection paths. This is according to the invention achieved, among others, by the use of electronic switching means. Disturbing waiting times such as occur in known systems operating exclusively with electromagnetic devices, are avoided.

The system according to the invention employs a special network of line conductors which extend in accordance with the wiring of the coupling field. This network serves for seeking the connection paths and is, therefore, referred to as routing network.

The system according to the invention is, accordingly, concerned with the routing of idle connection paths extending between a predetermined inlet and an idle outlet in a desired outlet group, whereby the connection paths extend over an inlet coupling multiple and an outlet coupling multiple, contained in a coupling field in which the coupling point rows of a coordinate direction are allocated to the inlets in the inlet coupling multiple while the coupling points in the outlet coupling multiple are allotted to individual outlets, and in which the hunting for idle connection paths is effected by means of a routing network the line disposition of which corresponds to that of the coupling field. The hunting for the connection path is according to the invention effected by placing on the idle outlets of the desired outlet group a potential marking the idle condition thereof while placing on all busy inlets a potential which dominates over the potential on the idle outlets, indicating the busy condition of the corresponding inlets, and selecting from coupling points of the outlet coupling multiple which are marked as idle, one such coupling point, such selected coupling point determining the path finding between the predetermined inlet and a suitable outlet, and such path finding determining a connection path and those of the coupling point contacts which are to be set for switching the connection path through.

The operating condition of the corresponding outlets, whether busy or idle, must accordingly be ascertained so as to determine one outlet in the involved outlet group; in addition, a test must be made to ascertain whether the trunk line belonging to a suitable outlet, is available or busy in connection with another extension of a call. The system according to the invention makes it possible to carry out these two tests, simultaneously, thereby achieving quick routing of calls. The lines or rows belonging to the corresponding outlet group of the outlet coupling multiple are at the same time tested for suitable outlets, that is, the operating condition of all involved outlets is simultaneously considered incident to the determination of an intermediate line.

It will be seen from the foregoing explanations that the invention proceeds from the premise that the routing of a connection path is to be effected in connection with a particularly constructed coupling field, namely, a coupling field (cross point network) having an inlet coupling multiple which is by means of trunk lines connected with an outlet coupling multiple, the latter exhibiting the peculiarity that its coupling points are allotted to individual outlets. In the inlet coupling multiple, the coupling points are multipled column-wise and row-wise; in the outlet coupling multiple, they are multipled column-wise but now row-wise. Cooperatively associated with this coupling field is a routing network which is constructed analogously. The object is to seek in the routing a connection path between a predetermined inlet and an idle outlet in a desired outlet group. This object is according to the invention achieved by placing on the inlets and outlets of the routing network in particular predetermined and relatively simple manner marking potentials, namely, a potential signifying idle condition (hereinafter briefly referred to as "idle potential") is placed on the idle outlets of the desired outlet group and on all busy inlets is placed a busy potential which predominates at the corresponding coupling points of the outlet coupling multiple with respect to the idle potential. Any desired coupling point of the outlet coupling multiple, among those that carry idle potential, can now be selected, thus determining the routing. The surprising result thereby obtained resides in the fact that the sought-for connection path is obtained without making it necessary to mark for the routing in particular manner a predetermined inlet of the coupling field or a point corresponding thereto. The routing to be effected in this manner depends however on the above described particular construction of the coupling field.

The invention also concerns particular means for the extension of busy potential to the coupling points of the outlet coupling multiple, and advantageous switching and circuit arrangements for the selection of a coupling point. An embodiment is given for the setting of coupling point contacts, employing relay couplers or cross-coil switches.

The various objects and features of the invention will appear from the description which will be rendered below with reference to the accompanying drawings. In the drawings, Fig. 1 shows a grouping plan for the two-stage coupling field that is being used;

Fig. 2 indicates the course of the line or speech current conductors *a* and *b*, of a connection path extending between the inlet and the outlet of the coupling field according to Fig. 1;

The construction of the coupling field shown in Fig. 1 and the course of the line or speech current conductors *a* and *b* shown in Fig. 2 will now be explained so as to facilitate understanding of the system according to the invention.

Figures 1, 2:
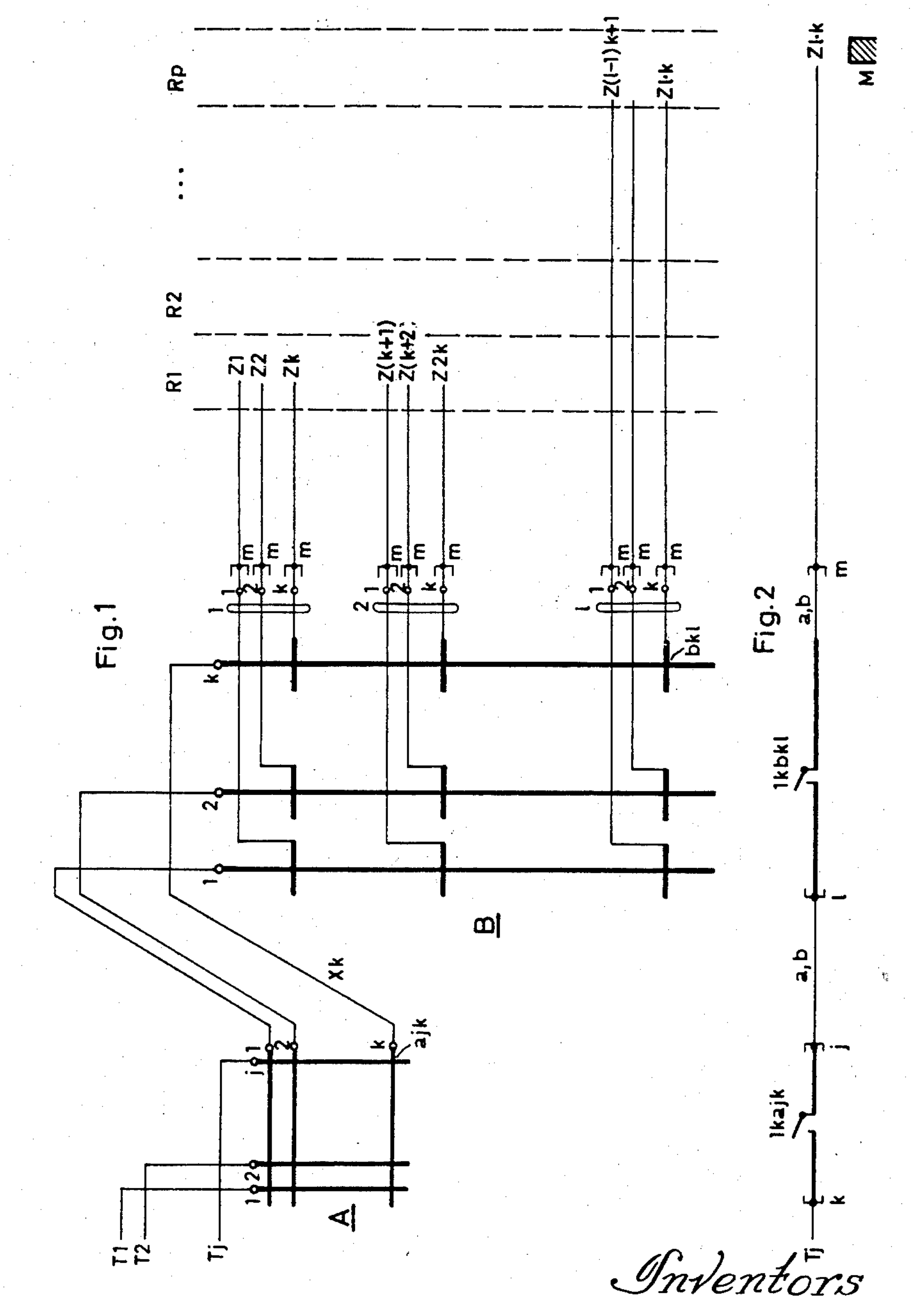

The two-stage coupling field comprises the coupling stages A and B shown in Fig. 1. Each coupling stage has a coupling multiple, namely, coupling stage A has the inlet coupling multiple and coupling stage B has the outlet coupling multiple. The inlet coupling multiple A has $j$ columns (vertical) and $k$ lines or rows (horizontal). In accordance with its previously stated properties, the coupling field accordingly has $j$ inlets. These are the inlets T1 to T$j$ operating with respect to the columns of the inlet coupling multiple. To each line or row is connected trunk line extending respectively to a column of the outlet coupling multiple. The latter accordingly has exactly as many columns as the inlet coupling multiple has lines or rows, that is, $k$ columns and each line or row of the outlet coupling multiple therefore has $k$ coupling points. To the coupling points of the first row of the outlet coupling multiple are allotted outlets Z1 to Z$k$ belonging to the outlet group R1. The outlets $Z(k+1)$ to $Z2k$ also belong to the outlet group R1. The remaining outlets belonging to this group R1 have been omitted in Fig. 1. Further outlet groups are provided and indicated at R2 . . . to R$p$. The outlets of the last row which is the $l$th row of the outlet coupling multiple, are the outlets $Z(l-1)k+1$ to $Zl \cdot k$ which belong to outlet group R$p$.

Figures 3, 4, 5, 6:
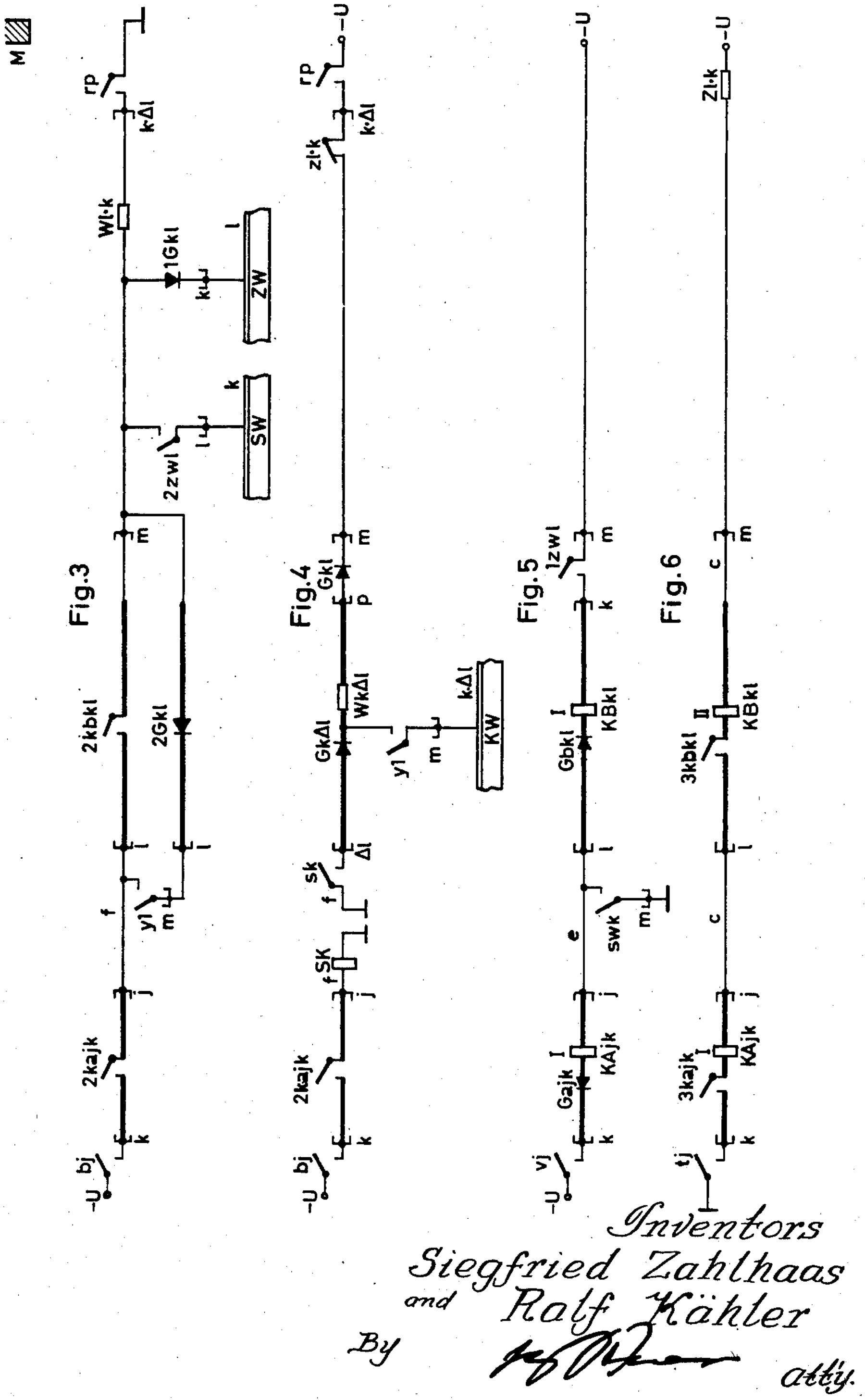
Figs. 3 and 4 illustrate two variants of the switching arrangement which is according to the invention employed for the hunting and selecting.
Fig. 5 represents the circuitry for the setting conductor *e* upon using relay couplers in connection with the switching arrangement according to Fig. 3.
Fig. 6 shows the circuitry for the private conductor *c* upon using relay couplers for the switching arrangement according to Fig. 3.

At the crossing points of the rows and columns of the coupling multiples, that is, at the coupling points, there are provided the previously mentioned coupling point contacts which are included in the multiple switches. Thus, there is in the inlet coupling multiple A at the crossing point $j$th column and the $k$th row, the coupling point $ajk$ to which are allotted the coupling point contacts $1kajk$ (Fig. 2), $2kajk$ (Figs. 3 and 4) and $3kajk$ (Fig. 6). To the coupling point $bkl$ of the outlet coupling multiple B are in similar manner allotted the coupling point contacts $1kbkl$, $2kbkl$, $3kbkl$, etc. These coupling point contacts are included in the network of the line conductors, the routing conductors and the seizure or private conductors. Other switching elements may of course be provided at these points in the networks.

Fig. 1 represents the grouping plan or scheme according to which the lines or trunks and coupling points of the coupling field are arranged. The line conductors $a$ and $b$ are carried over coupling point contacts disposed in the coupling multiples at the crossing points referred to. Fig. 2 represents a particular course of the line conductors $a$ and $b$ between one inlet and one outlet taken from several possible courses a connection path can take, to give an example. The course to be taken is determined, for example, by the setting, that is, by the closure of coupling point contacts which are disposed therealong. These contacts are shown in Fig. 2 in the open, that is, in their normal positions. The indicated connection path extends, for example, from the coupling field inlet $Tj$ to the coupling field outlet $Zl \cdot k$. The coupling field inlet $Tj$ is at the $j$th column of the inlet coupling field multiple and coupling field outlet $Zl \cdot k$ is at the $l$th row of the outlet coupling field multiple. The connection path extends from the coupling field inlet $Tj$ by way of the coupling point contact $1kajk$ to the $k$th trunk line between the inlet coupling field multiple and the outlet coupling field muliple. The coupling point $1kajk$, as its designation indicates, is accordingly disposed at the crossing point of the $j$th column and the $k$th row of the inlet coupling field multiple. The multiple symbols at the left and right of the coupling point contact $1kajk$ indicate that there are always several coupling point contacts connected in the columns and rows of the inlet coupling field multiple. The multiple symbol at the left refers to the coupling point contacts $k$ connected at a column, and the multiple symbol at the right refers to coupling point contacts $j$ connected at a row. From the coupling point contact $1kajk$ extends trunk line to the $k$th column of the outlet coupling multiple. The coupling point contact $1kbkl$ belongs to the connection path in the outlet coupling multiple. At the left of this contact is shown a multiple symbol which refers to coupling point contacts 1 connected to a column. No multiple symbol appears at the right of contact $1kbkl$ since the coupling point contacts extend individually to outlets of the coupling field. Accordingly, at the right of coupling point contact $1kbkl$ appears directly the outlet $Zl \cdot k$. The meaning of the multiple symbols $m$ shown in Figs. 1 and 2 will be presently explained.

Figs. 3 and 4 show in schematic manner two circuit or switching arrangements for carrying out the invention. The illustrated circuits contain respectively only those parts of the total circuit which belongs to one respective connection path. The coupling points of the outlet coupling multiple lying in these circuits in the same row, belong to the same outlet group.

While a given connection path is basically determined upon selection of the corresponding trunk line and of the coupling points, it must thereafter be completed by setting the corresponding coupling point contacts. This is done by the use of the networks of setting or control conductors and seizure or private conductors. The coupling point contacts are actuated by switching means included in the setting or control conductors and switching means included in the private conductors are operative to hold the actuated contacts in operated position until such a time when a connection is released either at the inlet or the outlet of the coupling field. The networks for the routing and setting can in view of this feature be used successively for building up many connection paths all of which remain simultaneously operative in the coupling field until release thereof. The routing is independent of the type of multiple switches employed for the setting of the coupling point contacts, but the type of multiple switch will effect the construction of the networks for the setting or control conductors and for the seizure or private conductors, respectively.

Figs. 3 and 4 show part of the network of routing conductors, referred to as $f$-conductors, superposed upon the coupling field. They constitute in similar manner as in Fig. 2, a part of the corresponding network. The networks of routing conductors are, as mentioned before, likewise constructed in accordance with the group scheme of Fig. 1, but exhibit additionally some peculiarities shown therein.

The structure and functions of the circuit arrangement represented in Fig. 3 will be described next.

The network of routing conductors extends between contacts which are respectively allotted to the inlets and outlets of the coupling field. The make or working contact $bj$ in Fig. 3, belongs to the inlet $Tj$ and is closed when this inlet is occupied by a call. At the coupling points of the inlet coupling field multiple are disposed coupling point contacts belonging to the routing network. Fig. 3 shows the coupling point contact $2kajk$ belonging to the connection path. The coupling points of the outlet coupling multiple also include coupling point contacts of which contact $2kbkl$ is shown in Fig. 3. Between the two coupling point contacts extends the routing conductor $f$. A resistor $Wl \cdot k$ is connected to the coupling point contact $2kbkl$ at the outlet side thereof, followed by the make or working contact $rp$. This latter contact is allotted to the outlet group which includes the outlet $Zl \cdot k$, such contact being common to all outlets belonging to this outlet group, which is the outlet group $Rp$. The multiple symbol $k \cdot \Delta l$ between the resistor $Wl \cdot k$ and contact $rp$ indicates that several resistors are connected to the contact $rp$. It shall be assumed that the outlets of $\Delta l$ rows of the outlet coupling multiple belong to the outlet group $Rp$. Since there are $k$ outlets connected to each row, there will result $k \cdot \Delta l$ outlets belonging to the outlet group $Rp$. The multiple symbols $m$ shown in Fig. 3 shall be neglected for the time being, and the contact $y1$ shall be considered to be substituted by a shunt. The contact $2kbkl$ will in such condition be bridged by a rectifier, for example, a diode rectifier $2Gkl$. The multiple symbol $l$ appearing in one of the leads to the rectifier indicates that such rectifier is connected to each routing conductor extending between the inlet coupling multiple and the outlet coupling multiple, belonging to a coupling point contact.

A row switch ZW and a column switch SW are provided for selecting in a given case one coupling point from those of the coupling points of the outlet coupling multiple which have been marked as idle by a potential connected thereto. The row switch ZW has as many inputs as there are rows in the outlet coupling multiple. The $k$ outlets of each row operate by way of $k$ decoupling rectifiers respectively upon the input allotted to the corresponding row. One of these decoupling rectifiers is indicated at $1Gkl$. The row switch ZW selects one from the inlets activated by potential indicating idle condition and actuates contacts allotted to such inlet, two of these contacts being respectively indicated at $2zwl$ (Fig. 3) and $1zwl$ (Fig. 5). The column switch SW has as many inputs as the outlet coupling multiple has columns, that is, $k$ inputs. Its inputs are respectively connected over contacts of the row switch to the outlets of the rows selected by the row switch. Among these contacts is the contact $2zwl$. The column switch selects one from its inputs which have been activated by potential indicating idle condition and actuates these contacts allotted to this input, of which contact $swk$ is shown in Fig. 5.

There is also provided a call coordinator or allotter and marker (not shown) which controls the successive routing of calls and actuates that one of the contacts $r1$ to $rp$ belonging to the respective outlet group to which a given call is to be extended. This may be assumed to be the outlet group $Rp$ with its contact $rp$. The inputs of the row switch ZW are now activated by potential, assumed to be ground potential, by way of contact *rp* and the $k \cdot \Delta l$ resistors connected thereto, among which is the resistor $Wl \cdot k$, and further by way of the rectifier 1*Gkl*.

Other coupling fields may operate with respect to the outlets which are available for the coupling field which has so far been considered. There will then be a multiple circuit of a plurality of coupling fields operating with respect to the same outlets. This multiple circuit is indicated by the multiple symbol *m* shown at a point between the coupling point contact 2*kbkl* and the resistor $Wl \cdot k$. It is in such situation possible that a coupling field outlet is already occupied by a call extended by way of one of the other coupling fields. The corresponding coupling field outlet is accordingly busy on its outlet side. The potential U would in such case be connected at the multiple symbol *m* of such connection path and would suppress the ground potential connected to indicate idle condition. Accordingly, only those outlets are marked with potential indicating idle condition, which are actually available for extending calls. The busy potential —U connected at the seized inlets and extending over seized intermediate lines and respectively associated rectifiers in the outlet coupling multiple, corresponding to the rectifier 2*Gkl*, to the coupling field outlets seized on the inlet side thereof, dominates and is therefore extended to the inlets of the row switch ZW which is affected by the coupling field outlets. In the path of propagation of the potential indicating idle condition, to the outlets of the outlet coupling multiple, there are disposed resistors of which resistor $Wl \cdot k$ is shown in Fig. 3. The busy potential extended in the given case to the inputs of the row switch ZW without interposition of resistors can accordingly dominate over the potential indicating idle condition. An input of the row switch ZW can be for several reasons free of potential indicating idle condition. Either all coupling field outlets operative with respect to such input are busy on their outlet sides, whereby the busy potential —U is connected at the multiple symbol *m*, or there extends to this outlet a switched-through connection path from an occupied coupling field inlet, and the dominating busy potential —U is accordingly extended to the corresponding input of the row switch. The corresponding input may also be free of the potential indicating idle condition when the trunk line which is connected at the column of the outlet coupling multiple at which lies the input of the row switch ZW, is already being used for a call, therefore carrying busy potential, which becomes operative with respect to this input of the row switch Z*w* by way of the decoupling rectifier lying at the respectively associated coupling point of the coupling outlet multiple.

As already described, when the row switch selects a row in which the coupling field outlet which is to be used has to lie, and connects the column switch with this row, which selects in corresponding manner an outlet in such row, such operations determine at the same time the column of the outlet coupling multiple to which this outlet belongs. There is thus found a suitable coupling field outlet and the respectively associated coupling point of the outlet coupling field multiple. Determination of this coupling point determines the connection path to a certain inlet of the coupling field since there is only one connection path due to the grouping scheme of the coupling field. The routing is thus concluded. It will be seen that an individual determination of the desired coupling field inlet is not required in the routing network. It will suffice to mark by busy potential the seized or occupied inlets of the coupling field.

In the circuit arrangement according to Fig. 3, the desired outlet group is being considered with the aid of contact *rp* or equivalent contact means. The contacts may also be substituted by a shunt and make or working contacts may be included in the leads to the row switch directly ahead of the inputs thereof, which are closed by the marker only when the corresponding row belongs to the desired outlet group. Only the involved part of the row switch inputs will then be connected to the circuit. Only this portion will be considered incident to a selection operation. In the event that multiple utilization of inputs is desired, the row switch need have only as many inputs corresponding to the maximum number of rows included in output group.

In the arrangement according to Fig. 3, the busy potential appearing at seized coupling field inlets may be such that it may prevent the activation of switch inputs. If this potential for some reason has this characteristic, a suitable conversion may be effected, for example, in the course of the trunk lines between the inlet coupling field multiple and the outlet coupling field multiple, by means of relays and relay contacts. Such a conversion is indicated in Fig. 4, making use of a relay S*k* and contact *sk* controlled thereby. The relay is supplied by the primary busy potential —U at the inlet end of the routing conductor. Its make contact *sk* supplies ground potential acting in the manner of a secondary busy potential in the direction of the outlet end of the trunk line conductor.

After determining a connection path between a predetermined inlet and an outlet of the desired outlet group, there only remains the problem of switching the connection path through by the setting of the corresponding coupling point contacts, whereupon the routing network will be available for further selection operations. The corresponding coupling point contacts must for this purpose be actuated and thereafter held in actuated position. The actuation of the contacts is effected by means of setting switching means connected in a network of setting conductors superposed on the coupling field, the conductor disposition corresponding to that of the coupling field, and such network marking the selected connection path as required. The holding of the actuated coupling point contacts is effected by means of holding devices of the actuated setting means, whereby the holding is advantageously made dependent upon the presence of a busy potential on the seizure or private conductor. The disposition of the network of seizure or private conductors corresponds likewise to that of the coupling field. The marking of the routing network by potential indicating idle condition and the marking of the setting network can be cancelled after operative actuation of the holding means.

An example shall now be described for the setting of the coupling point contacts in accordance with this routing operation, by the use of relay couplers as multiple switches. Figs. 5 and 6 show the corresponding circuitry for the setting conductors and the private or seizure conductors. Series circuits of decoupling rectifiers and setting windings I of coupling relays are connected at the crossing points of the columns and rows, that is, at the coupling points, in the coupling multiples at the networks of the setting conductors. Fig. 5 shows a part of this network which corresponds to the selected connection path between the coupling field inlet T*j* and the coupling field outlet $Zl \cdot k$. The selection contacts 1*zwl* and *swk* shown in Fig. 5 are for the actuation of the coupling point contacts closed after completed routing. The call coordinator effects closure of the inlet contact *vj* which is individual to the inlet T*j*. The operating winding I of the coupling relay KB*kl* energizes after actuation of the contact 1*zwl* and *swk*, and such coupling relay operates its contacts, which are coupling point contacts. The actuation of contacts *vj* and *swk* causes energization of relay KA*jk* which accordingly actuates its contacts. The contacts actuated by the two coupling relays are in part disposed in the line conductors *a* and *b* (see Fig. 2); these being the contacts 1*kajk* and 1*kbkl*. These contacts switch the talking path through. The other contacts are disposed in the routing network and in the network of the private conductors. The function of the contacts $2kajk$ and $2kbkl$ lying in the routing network has already been described. The actuation of the contacts $3kajk$ and $3kbkl$ lying in the network of the private conductors and of the contact $tj$ allotted to the coupling field outlet $Tj$ causes energization of the holding windings II of the coupling relays $KAjk$ and $KBkl$ in a holding circuit. The contact $tj$ remains closed for the duration of the call signalled from the associated coupling field inlet $Tj$. Upon opening of the contact $tj$, the holding winding II of the coupling relays $KAjk$ and $KBkl$ will be deenergized, and the connection will be released.

Fig. 4 shows part of a circuit arrangement for carrying out the path finding in accordance with the invention which operates in somewhat different manner than the arrangement according to Fig. 3. In this arrangement, corresponding coupling points belonging to different outlet groups are combined in the routing network. The respectively associated outlets operate simultaneously with regard to these combined coupling points. There is also provided a coupling point switch comprising a plurality of inputs corresponding in number to the maximum number of outlets in the same outlet group. The combined coupling points, which will be referred to as switching points, operate with respect to these inputs. The switching arrangement accordingly differs from the one shown in Fig. 3, by a different selection operation for the coupling points of the outlet coupling multiple. The trunk line conductors contain moreover relay means, disposed between the inlet coupling multiple and the outlet coupling multiple, for effecting the previously mentioned potential conversion.

The part of the routing network belonging in the embodiment according to Fig. 4 to the inlet coupling multiple is constructed just like the corresponding part of Fig. 3. The part belonging to the outlet coupling multiple is, however, different from the corresponding part of Fig. 3. The number of switching points which operate with respect to the coupling point switch KW is due to the combining of coupling points smaller than the number of coupling points of the outlet coupling multiple, the number of such coupling points being equal to the maximum number of outlets and coupling points, respectively, which belong to an outlet group. The switching points are arranged in crossing manner just as the coupling points. In the maximum number of rows of the outlet coupling multiple, which are allotted to an outlet group, is assumed to be 1, the crossing arrangement of switching points will accordingly have 1— rows. At the outlet side of the trunk line $f$ which extends to a coil disposed in crossing fashion with respect to all these rows, therefore appears the multiple symbol $l$. Each switching point is connected with as many outlets of the coupling field as there are outlet groups, namely, $p$ outlet groups. A multiple symbol $p$ accordingly appears between the individual outlet contacts and the switching points. There are moreover decoupling rectifiers provided, one such rectifier being shown in Fig. 4 at $GKl$. These decoupling dectifiers prevent mutual falsification of the operating potential, that is, the potential respectively indicating idle or busy condition, from the corresponding outlets of different outlet groups. At each switching point is provided a series circuit comprising a rectifier and a resistor; thus, at the switching point of Fig. 4, there is the rectifier $Gkl$, the function of which corresponds to the function of rectifier $2Gkl$ of Fig. 3, and the resistor $Wk\Delta l$; the purpose of which corresponds to that of resistor $Wl \cdot k$ of Fig. 3, namely, to permit domination of the potential indicating busy condition over the potential indicating idle condition. Disposing this resistor at the switching points instead of at the outlets, as in Fig. 3, reduces the number of resistors required, thus constituting an advantage of the arrangement. An input of the coupling point switch KW is connected to the juncture point between the rectifier $Gk\Delta l$ and resistor $Wk\Delta l$, other inputs of the switch being similarly connected to other switching points. The coupling point switch accordingly has a total of $k \cdot \Delta l$ inputs, since there are $\Delta l$ rows, respectively containing $k$ switching points, that is to say, as many switching points as there are rows. The multiple symbols $m$ shall be neglected for the time being and the contact $yl$ shall be assumed to be shunted. In this arrangement, the contacts which are allotted to the outlet groups, are connected in series with special outlet contacts alloted to the outlets. These outlet contacts are closed when the corresponding outlet is idle and open when it is busy in connection with a call that has been extended or switched through. These contacts are also open when the corresponding call extends by way of another coupling field. In Fig. 4, the outlet contact is indicated at $zl \cdot k$ and is disposed in series with contact $rp$ which is allotted to the outlet group $Rp$.

Figure 7:
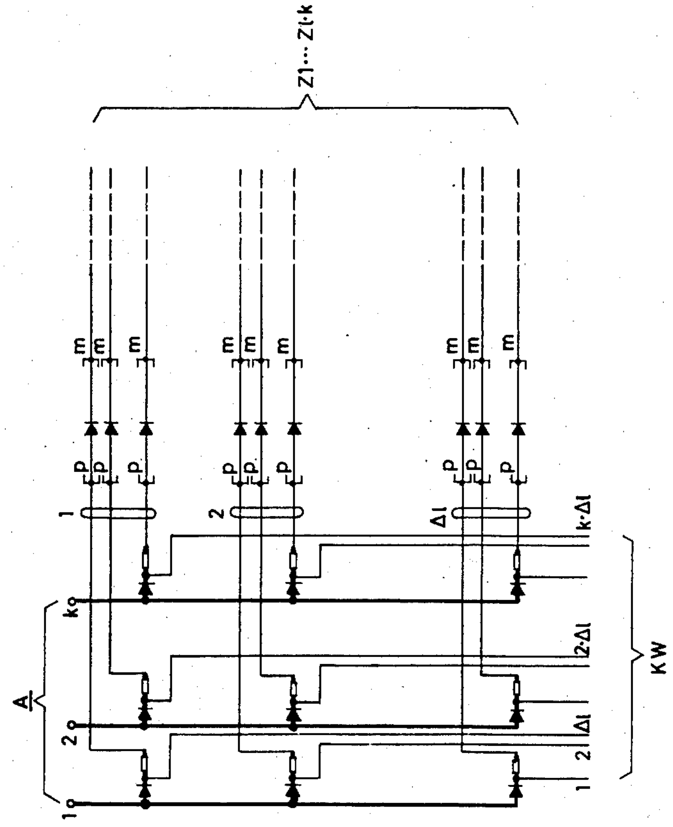
Fig. 7 illustrates as an aid to the understanding of the invention a part of the switching arrangement according to Fig. 4 in more complete representation thereof.
Figure 8:
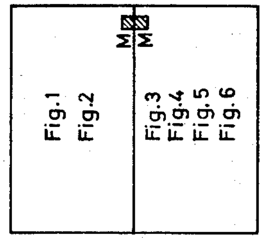
Fig. 8 indicates how Figs. 1–6 should be placed with the index mark M in alignment so that the switching elements of these figures are properly positioned.

In order to facilitate understanding, the arrangement of the switching points in $\Delta l$ rows each with $k$ columns is more in detail illustrated in Fig. 7, the columns 1, 2 . . . $k$ being connected by way of trunk line conductors and the switching points 1, 2 . . . 1 . . . $k \cdot \Delta l$ being connected with the coupling point switch KW.

When extension of a call is indicated at a coupling field inlet, the contact belonging to the desired outlet group, assumed to be contact $rp$, will be closed. The potential —U indicating idle condition, is thus extended to the switching points. Ground potential indicating busy condition will appear, as in Fig. 3, at those of the switching points connected to columns which are connected by way of the potential conversion device with the relay $Sk$ etc. and by way of the inlet coupling multiple with busy inlets and, accordingly, with closed inlet contacts, such ground potential dominating at the corresponding inputs of the coupling point switch KW. Therefore, only those of the inputs of the coupling point switch will be activated belonging to switching points lying on columns the trunk lines of which are idle. The coupling point switch selects one of these switching points, thereby determining the coupling point in the outlet coupling multiple which is to be used for the connection path or extension of a call; the coupling point in the group of coupling points leading to the desired outlet group being fixed in the selection operation, and the outlet group as such being fixed, which is of course a requirement for the actuation of contact $rp$. Since the switching arrangements according to Figs. 3 and 4 are based on the same grouping plan, the determination of a coupling point in the outlet coupling multiple constitutes exactly as in the circuit according to Fig. 3 determination of a coupling point in the inlet coupling multiple and therewith determination of the entire connection path.

Explanations with respect to the extension or switching-through operations of Fig. 4 are omitted at this point inasmuch as such operations for the setting of coupling point contacts have been given in connection with Fig. 3. The switching-through of a connection path or call may of course be accomplished by means of multiple switches differing from the relay switches referred to in the described example.

The described switching arrangements for the hunting, selection and setting (routing) of connection paths may also be used for several coupling fields having their own inlets and connected in multiple to the same outlets. In such cases, a single selection device may be used for the outlet coupling multiple, that is, either a column selector or a row selector or a coupling point selector. The multiple circuit for the outlets is indicated in Figs. 1 to 7 by multiple symbols $m$ at the outlets shown therein. In the switching arrangement according to Fig. 3, the rectifier $2Gkl$ is in the coupling field by way of contacts controlled by the associated call coordinator, such as contact $y1$, connected to the inlet coupling multiple containing the inlet from which a call is to be extended. The selection operation accordingly depends solely on the operating condition (idle or busy) of the inlets of this coupling field and effects selection of a coupling point in the outlet coupling multiple which is suitable for the corresponding coupling field. Since the inlet contact in the networks of the setting or control conductors and the seizure or private conductors is closed only in the involved coupling field, energization of coupling relays will be effected only in the relay couplers belonging to this coupling field, thus assuring proper switching-through of the correct connection path. In the circuit according to Fig. 3, seizure of coupling field outlets from inlets thereof is effected by means of coupling point contacts in the outlet coupling multiple, for example, by contacts such as *2kbkl*.

When a connection path has been switched through between an inlet of one of the coupling fields and an outlet, the potential indicating busy condition is in each case extended to the occupied outlet independent of the operating position of the contacts *y1* . . . which are controlled by the call coordinator.

In the circuit according to Fig. 4, the call coordinator contacts are included in the leads extending to the coupling point switch, one such contact being indicated at *y1*. These contacts connect the switch KW respectively with the switching points of the outlet coupling multiple belonging to the coupling field which includes the inlet from which a connection is to be extended, thus determining in each case a suitable switching point and therewith a coupling point and a connection path. Outlet contacts are provided in this circuit arrangement which mark the busy condition of the outlets by being in open position, thereby preventing extension of the potential indicating idle condition. Coupling point contacts corresponding to contacts such as *2kbkl* in Fig. 3 are in such case unnecessary.

Changes may be made within the scope and spirit of the appended claims which define what is believed to be new and desired to have protected by Letters Patent.

We claim:

1. In a telephone system, a coupling field for extending calls to be established, said coupling field having an inlet coupling multiple and an outlet coupling multiple represented respectively by switching means operating in the nature of coordinate switches, trunk lines extending between said multiples, means forming coupling points in the respective multiples, the coupling points in said inlet multiple being multipled column-wise and row-wise and the coupling points in said outlet multiple being multipled solely column-wise and alloted to individual outlets disposed in groups, a routing network cooperatively associated with said coupling field, an arrangement for effecting the routing of a connection path between a predetermined inlet and an idle outlet in a desired outlet group, said arrangement comprising circuit means for connecting to idle outlets of a desired outlet group a potential signifying the idle condition thereof, means for connecting to all busy inlets a busy potential which dominates at the corresponding coupling points of the outlet coupling multiple over the potential signifying idle condition, and means for selecting, from the coupling points of the outlet coupling multiple carrying potential signifying idle condition, an outlet and thereby determining the routing of a connection path.

2. A system according to claim 1, comprising means in said routing network, including decoupling rectifier means, for extending to coupling points in said outlet coupling multiple potential signifying busy condition of trunk lines.

3. A system according to claim 2, comprising means for converting said busy potential incident to the extension thereof.

4. A system according to claim 2, wherein serially disposed coupling points of the outlet coupling multiple which cross the rows corresponding to trunk lines belong to the same outlet group.

5. A system according to claim 1, comprising routing conductors in said routing network, and means for serially disposing coupling points of said outlet coupling multiple which cross the rows corresponding to routing conductors belonging to the same outlet group.

6. A system according to claim 5, comprising a row switch for said outlet coupling multiple included in said routing network, means for row-wise connecting to the inputs of said row switch by way of decoupling rectifiers coupling contacts of the outlet coupling multiple, said switch selecting one of the inlets activated by potential indicating idle condition, thereby determining a row. a column switch, means for connecting to the inputs of said column switch column-wise by way of make contacts coupling point contacts of the outlet coupling multiple, said row switch actuating those of the make contacts connected with coupling point contacts of a row which are determined by the row switch, said column switch selecting one of the inlets activated by potential indicating idle condition and thereby determining a column and the intermediate line respectively associated therewith.

7. A system according to claim 5, wherein corresponding coupling points belonging to different outlet groups are combined in the routing network, respectively associated outlets operating by way of decoupling rectifier means simultaneously with respect to said combined coupling points, a coupling point switch having a number of inputs corresponding to the maximum number of outlets in the same outlet group, said combined coupling points being operative with respect to the inputs of said switch.

8. A system according to claim 7, comprising control means for actuating said coupling point contacts, and means for disposing said control means in a network of control conductors superposed on said coupling field, the disposition of conductors of said network corresponding to that of the coupling field and being marked corresponding to the selection of the connecting path.

9. A system according to claim 8, comprising control holding means controlled by said setting means depending upon busy potential on a private conductor for holding actuated coupling point contacts in operated position.

10. A system according to claim 9, wherein the marking of said setting network is cancelled responsive to operative actuation of said holding means.

11. A system according to claim 8, comprising relay couplers for said coupling field, wherein said control network extends by way of operating windings of coupling relays which are decoupled by rectifier means, with the outlets in said outlet coupling multiple being row-wise combined, and wherein those outlets are disposed for the operative control of the predetermined inlet by means of a row switch, which lie in the row determined thereby, and wherein the trunk line determined by the column switch is marked thereby, said marking being respectively effected by the energization of the coupling relay disposed in the selected connection path of the inlet coupling multiple and by the coupling relay disposed in said outlet coupling multiple.

12. A switching arrangement according to claim 11, comprising a network of private conductors the disposition of which corresponds to that of the coupling field, holding windings of said coupling relays disposed in said network in series with the respective coupling point contacts, and means responsive to the actuation of said coupling point contacts for energizing the holding windings corresponding thereto for the duration of the extension of the corresponding connection path.

13. A system according to claim 1, comprising resistor means for extending said potential indicating idle condition.

14. A system according to claim 1, comprising a plurality of coupling fields having respectively inlets associated therewith and being connected in multiple to identical outlets, a single selection device for effecting said coupling point selection, and contact means for controlling the operation of said selection device depending upon the operating condition of the inlets of the coupling field at which is disposed the inlet from which a connection path is to be extended.

References Cited in the file of this patent

UNITED STATES PATENTS

| | | |
|---|---|---|
| 2,722,567 | Davison et al. | Nov. 1, 1955 |
| 2,769,865 | Faulkner | Nov. 6, 1955 |
| 2,761,012 | Murray | Aug. 28, 1956 |
| 2,777,015 | Jacobaeus et al. | Jan. 8, 1957 |
| 2,787,666 | Flood | Apr. 2, 1957 |
| 2,862,060 | Ducamp et al. | Nov. 25, 1958 |